United States Patent [19]

Paweletz

[11] Patent Number: 5,537,810
[45] Date of Patent: Jul. 23, 1996

[54] MAGNETIC-GAS BEARING FOR A SHAFTLESS SPINNING ROTOR FOR AN OPEN-END SPINNING MACHINE

[75] Inventor: Anton Paweletz, Fellbach, Germany

[73] Assignee: SKF Textilmaschinen-Komponenten GmbH, Stuttgart, Germany

[21] Appl. No.: 355,643

[22] Filed: Dec. 14, 1994

[30] Foreign Application Priority Data

Dec. 14, 1993 [DE] Germany .......................... 43 42 582.8

[51] Int. Cl.⁶ ............................................... D01H 4/14
[52] U.S. Cl. .................................. 57/406; 57/100
[58] Field of Search ............................ 57/100, 406, 404, 57/414

[56] References Cited

U.S. PATENT DOCUMENTS

| | | | |
|---|---|---|---|
| 4,022,008 | 5/1977 | Pimiskern et al. | ........................ 57/100 |
| 4,306,166 | 12/1981 | Quandt | ................................. 57/100 X |
| 4,543,780 | 10/1985 | Muller et al. | ......................... 57/100 X |

FOREIGN PATENT DOCUMENTS

| | | |
|---|---|---|
| 0190440A2 | 8/1986 | European Pat. Off. . |
| 2524061A1 | 12/1976 | Germany . |
| 3239328A1 | 4/1984 | Germany . |
| 3024921C2 | 12/1984 | Germany . |
| 2558758C2 | 5/1985 | Germany . |
| 4104250A1 | 8/1992 | Germany . |
| 4207673C1 | 3/1993 | Germany . |
| 4-119222 | 4/1992 | Japan . |
| 4-171316 | 6/1992 | Japan . |
| 1687660 | 10/1991 | U.S.S.R. ................................. 57/100 |

*Primary Examiner*—Joseph J. Hail, III
*Attorney, Agent, or Firm*—Shefte, Pinckney & Sawyer

[57] ABSTRACT

In order to improve the smoothness of operation of a shaftless spinning rotor embodied as the rotor of an axial field motor wherein the rotor is supported by a magnetic gas bearing, a guide magnet arrangement for generating a magnetic guiding field is decoupled mechanically from the drive component of the stator. To that end, separate magnet and stator components are connected to one another by means having both elastic and damping properties, e.g., rubber. This mechanical decoupling makes it possible for the separate components to execute vibration independently of one another and for vibration to be transmitted from one component to another only in highly attenuated form. Hence, machine vibration can substantially be prevented from affecting the smoothness of rotor operation. Tangential forces generated by harmonics and radial forces caused by magnetic or mechanical asymmetries can likewise be absorbed by the stator, with an attendant improvement in smoothness of rotor operation.

16 Claims, 4 Drawing Sheets

MAGNETIC-GAS BEARING FOR A SHAFTLESS SPINNING ROTOR FOR AN OPEN-END SPINNING MACHINE

FIELD OF THE INVENTION

The present invention relates to a combined magnetic-gas bearing for a shaftless spinning rotor for an open-end spinning machine, wherein the rotor is embodied as the rotor of an axial field motor. More particularly, the bearing substantially comprises a first bearing face, associated with the rotor and remote from the spinning chamber of the rotor, and an opposed bearing face, spaced from the bearing face by an air gap, associated with the stator of the axial field motor, with means producing magnetic fields for driving and guiding the rotor to create a combined magnetic and gas bearing, including a magnetic arrangement concentric with the rotor axis for generating the magnetic guide field, and means for conducting the magnetic flux for the magnetic drive and guide fields.

BACKGROUND OF THE INVENTION

As development of rotor spinning machines progresses, the goal is not only to improve the quality of the yarns produced but, above all, to increase production capacity. A key factor in increasing production capacity is the rotary speed of the spinning rotor. For this reason, varied kinds of drives and bearings for spinning rotors have been developed, in order to reach rotary speeds of markedly over 100,000 rpm. Reducing the rotor diameter and mass and lowering friction losses enables not only greater rotary speed but also reduced energy consumption when driven.

In this respect, a shaftless spinning rotor, which is embodied as the rotor of an axial field motor, can be considered especially advantageous by providing a combined magnetic and gas bearing which assures relatively low friction losses.

For example, German Patent Publication DE 42 07 673 C1 discloses an axial field motor having a guide magnet arrangement disposed at the center of the rotor and the stator, which generates axial and radial forces and provides a dependable guidance for the spinning rotor. The rotor and stator are kept spaced apart by means of an air or gas cushion emitted from air nozzles associated with the bearing arrangement to act in opposition to the attractive magnetic force. Various factors, such as harmonics in the magnetic field, magnetic and mechanical asymmetries (i.e., imbalances), or transmitted machine vibration, however, can impair the operating uniformity and smoothness of the rotor.

SUMMARY OF THE INVENTION

It is accordingly an object of the invention to improve the smoothness of rotor operation in a spinning rotor of the shaftless type embodied as the rotor of an axial field motor and supported by a combined magnetic gas bearing.

Briefly summarized, this objective is achieved in accordance with the present invention in a shaftless rotor assembly for an open-end spinning machine embodied as an axial field motor including a rotor and a stator ring wherein the rotor has a body defining a spinning chamber, an opening into the chamber and a bearing face opposite the rotor opening, and the stator ring has an opposed facing bearing face. Means are provided for producing a combined magnetic and gas bearing for supporting the rotor relative to the stator ring, including means for producing a first field of magnetic flux for guiding a rotational axis of the rotor to orient and maintain the axis in a stationary disposition and means for producing a second field of magnetic flux for driving rotation of the rotor about the axis. The means for producing the first magnetic field preferably includes a rotationally symmetrical magnet unit arranged within the stator ring concentric with the rotor axis. Means are also provided for conducting the magnetic flux for the driving and guiding magnetic fields. According to the present invention, resilient damping means are utilized for mechanically decoupling the rotationally symmetrical magnet unit and the stator ring from one another, and other means which mount the stator ring to a stationary component of the spinning machine include means for mechanically decoupling the stator ring and the stationary component. A generally non-magnetic barrier layer is disposed between the first and second flux conducting means for decoupling the respective magnetic fluxes.

The invention is based on the recognition that it is nearly impossible, without substantial effort, to entirely eliminate the causes of motor vibration. For example, so-called harmonics arise if a characteristic of the magnetic field revolving with the rotor deviates from a precisely sinusoidal form. These harmonics have a feedback effect on the rotor and can generate alternating and tangentially oriented forces that impair the smoothness of rotor operation. Magnetic and mechanical asymmetries generate essentially radially oriented forces, which likewise negatively impact the smoothness of rotor operation. Because the invention deviates from the conventional construction of an axial motor with a rigid, compact structure of the stator block by mechanically decoupling from the stator ring the concentric magnet arrangement for generating the guiding magnetic field, these stator components are enabled to vibrate independently whereby the natural frequency of these mechanically decoupled stator components is raised markedly above the incident vibration frequencies of the machine and, moreover, the individual components are enabled to have different natural vibrational frequencies. Thus the vibrational motion of one component is not transmitted, or is transmitted only very incompletely, to the other component. Because of the increased mobility of the stator, tangential forces caused for example by harmonics, or radial forces generated by magnetic or mechanical asymmetries can be absorbed or intercepted by the stator to such an extent that any resultant vibration of the rotor is reduced markedly. Likewise, because of the dual decoupling of the present invention, vibrations of the machine are not transmitted to the central guide magnet arrangement.

Since the connecting means have not only elastic but also damping properties, upward deflection, movement or "creep" of the system is prevented.

To attain suitable centering relative to other parts of the spinning box, especially parts that protrude into the spinning rotor itself such as the draw-off nozzle and sliver feed conduit, the stator should be connected to a part of the spinning box that is rigidly connected to the aforementioned parts such that an optimal mutual dynamic alignment of these components exists in the relaxed state of the means that effects the mechanical decoupling.

It is to be recognized that the magnetic fields of the outer, axially symmetrical drive magnets have a chronologically and spatially changing component and impair the constant magnetic fields of the guide magnets when these fields overlap and cause an asymmetrical field strength distribution in the center of the spinning rotor. Thus, provision should be made for magnetic decoupling of the respective magnetic fluxes of the respective magnetic fields produced by the drive and guide magnets. For this purpose, the present invention provides an insulating layer between separate yokes that conduct the respective magnetic fluxes to perform the task of both mechanical and magnetic decoupling which makes highly smooth operation possible and enables a reduction in energy consumption.

Rubber may advantageously be used as a suitable material for the elastic damping means and the mounting means since it has both elastic and damping properties and is economical, but any of various other materials with rubberlike properties, such as an elastomer, are also usable. Steel or other like springs similarly have the damping and elastic properties required by the present invention. A combination of these materials is especially favorable, with the metal springs retained at least at their ends in a rubberlike material.

Axial spacing of the flux-conducting yokes for the drive and guide magnets of the rotor is highly desirable to accomplish magnetic decoupling whenever the yoke for the drive magnets also covers the central region of the rotor at which the guide magnets are disposed, e.g., when the base surface of the rotor serves as the flux-conducting means, which is desirable to shorten the magnetic flux lines as compared with a merely annular yoke.

A relatively narrow air gap, normally in the range of a few hundredths of a millimeter, is formed between the stator ring and the rotor because of the equilibrium between magnetic attraction and the gas cushion. A rotor bearing face that is stepped at the axial center makes it possible to increase the axial length of the air gap in this region. As a result, not only do thermally induced dimensional changes and soiling in this region have less effect so as to avoid attendant damage, but also the increased mobility of the stator guide magnets relative to the stator ring resulting from their mechanical decoupling can be exploited fully without causing contact with the opposite bearing face of the rotor and consequently causing damage.

A compressed gas duct is provided in order to produce a gas cushion in the magnetic-gas bearing between the rotor and the stator and is preferably formed as an arrangement of outlet openings in the rotationally symmetrical magnet unit recessed within the stator so as to be spaced apart farther from the opposite bearing face of the rotor than would exist if the openings were arranged in the same plane as the main portion of the stator bearing face. Thus, any danger of damage to these outlet openings is avoided since, even upon a direct contact with the opposed bearing faces in the main part of the bearing, the outlet openings would still be separated from the opposing bearing face of the rotor by an air gap.

In order to assure that all the compressed gas emerging from the outlet openings can flow radially outwardly through the air gap between the rotor and the stator so as to generate the gas cushion required between the main portion of the bearing faces of the rotor and stator, a seal is preferably provided in the region of the rotationally symmetrical magnet unit that prevents unintended axial outflow of compressed gas in that region. Advantageously, this function can be performed directly by the resilient damping means between the magnet unit and the stator.

To avert damage in the region of the annular gap radially between the stepped bearing face of the rotor and the recess in the stator which could occur in the event of mechanical contact resulting from a radial rotor deflection or vibration of the stator ring, it is advantageous to provide wearproof protective faces annularly about the rotor and the stator. Thus, it is no longer necessary, as in the prior art, to provide protective faces on the outer circumference of the rotor.

If the rotationally symmetrical magnet unit that contains the concentric magnet arrangement for the stator is connected to a stationary part of the spinning machine, then the symmetrical magnet unit is maintained suitably centered and stationary. Because of the mechanical decoupling of the magnet unit from the stator ring, vibration thereof is not transmitted to the magnet unit or is transmitted to only a very slight extent. As a result, this rotationally symmetrical magnet unit maintains a stable central position. Hence the guide magnetic fields also are isolated from any such vibration of the stator which further serves to stabilize the rotor position during its rotation. Preferably, the connection between the rotationally symmetrical magnet unit and the stationary part of the spinning machine is also advantageously achieved by a resilient connection means so as to effect a mechanical decoupling of the magnet unit from the machine, whereby vibration that arises in the spinning machine is essentially not transmitted to the magnet unit.

DESCRIPTION OF THE PREFERRED EMBODIMENTS

Figure 1:
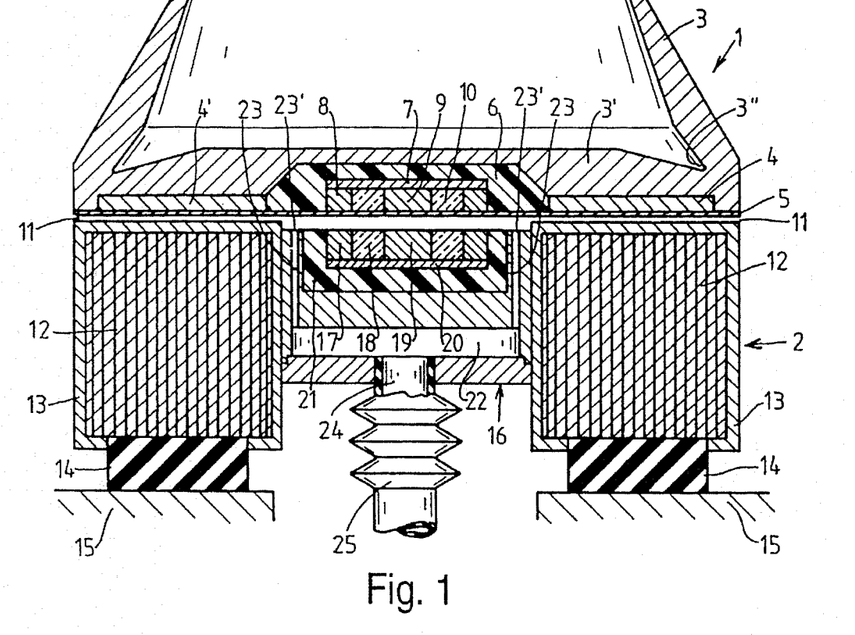
FIG. 1 is an axial cross-section through a shaftless spinning rotor assembly embodied as an axial field motor according to the invention, wherein the guide magnet arrangements for the rotor and the stator are embedded in carrier layers that effect a mechanical and magnetic decoupling from the surrounding parts.

Referring now to the accompanying drawings and initially to FIG. 1, a shaftless spinning rotor 1 according to the present invention is embodied as the rotor of an axial field motor in assembly with a stator 2 of the motor. The main body of the spinning rotor 1 forms a spinning cup 3 open at its top with a circular disk-like base 3' from which an annular outer wall extends to define a spinning chamber therewithin with an annular fiber collecting groove 3" extending circumferentially at the juncture of the base 3' and the annular wall, this structure of the rotor 3 being concentric about and defining an axis of rotation 11. As is known in open-end spinning, opened individualized fibers are fed into the chamber to collect centrifugally in the groove 3" as a result of driven rotation of the rotor 3 and the collected fibers are progressively drawn from the spinning chamber to form a yarn or thread. The means by which fibers are delivered into the chamber and the means by which the yarn is withdrawn from the chamber are known but are not shown for the sake of simplicity in that elements do not have any influence on the subject of the present invention.

An arrangement of guide magnets 8,9 formed as an independent rotationally symmetrical unit is embedded in an elastic supporting and insulating composition 6 in a recessed throat area of the rotor base 3' remote from its spinning chamber. This elastic supporting and insulating composition 6 may, by way of example, be formed of rubber, or a comparable synthetic or other rubber-like material, which has both elastic and damping properties. As a result, the guide magnet arrangement can itself execute vibration to a limited extent independently of the remainder of the rotor 1.

The arrangement of guide magnets associated with the rotor includes a central retaining magnet 9 and a concentrically disposed magnet ring 8 of opposite polarity separated from one another by a magnetically insulating ring 10. A yoke 7 covers the magnets 8,9 to conduct or guide the magnetic flux in this region.

Drive magnets comprise, for example, segmental magnet plates 4,4' of alternating polarity affixed in axially symmetrical relation to one another to the rotor base 3', which is made of a magnetically conductive material to likewise act as a yoke to conduct the magnetic flux of the drive magnets 4,4'. A magnet supporting and cover layer 5 retains the drive magnets 4,4' and forms a bearing face of the rotor 1.

The stator 2 is spaced apart from this rotor bearing face 5 by an air gap 11 a few hundredths of a millimeter wide, which occurs when there is an equilibrium between the magnetic attraction of the drive and guide magnets and a gas cushion between the stator 2 and the rotor 1, as more fully described below.

The stator 2 includes a stator ring 12 that carries a winding assembly 13 and forms a magnetic core for the winding assembly. The winding assembly 13 is connected to a stationary machine part such as the spinning box, only representatively indicated at 15, via a rubber or other resilient buffer ring 14, with the opposite side of the assembly 13 forming an opposed bearing face to that of the rotor 1. As a result, this stator ring 12 is essentially mechanically uncoupled or isolated from the spinning box and otherwise from the spinning machine whereby machine vibration is not transmitted, or at least is transmitted only in highly attenuated form, to the stator ring 12 and hence to the axial field motor. Likewise, vibration of the stator ring that arises in the axial field motor itself is not transmitted to the spinning machine, or is at least transmitted only in highly attenuated form.

A central component 16 of the stator 2 is disposed within the axial center of the stator ring 12 in rotationally symmetrical relation therewith and is firmly affixed to the stator ring 12. The central component 16 includes a guide magnet arrangement, which is essentially equivalent in its dimensions and configuration to the guide magnet arrangement for the rotor, likewise comprising a central retaining magnet 19 and a concentric magnet ring 17 spaced apart and magnetically insulated from one another by an insulating ring 18. Hereagain, a disklike yoke 20 serves to conduct or guide the magnetic flux. The polarity of the individual magnets of the two guide magnet arrangements is such that opposite magnet poles always face one another, in order to generate a force of attraction required for the magnetic gas bearing.

The guide magnet arrangement within the stator is likewise embedded as a separate rotationally symmetrical unit in a rubber or otherwise elastic layer 21 and thus mechanically uncoupled from the surrounding components and elements. Thus, any vibration in the region of the guide magnet arrangements is not transmitted to the surrounding parts and, likewise, vibration of the surrounding elements is not transmitted to the guide magnet arrangements. Because of the simultaneously elastic and damping action of the rubber layers, the elements connected to one another by it can vibrate to a maximum extent independently of one another. Because of the attendant increase in the natural frequency of the vibrating parts, especially the guide magnet arrangements, the vibration frequency of machine vibration, which typically will be markedly less, can be transmitted only in extremely attenuated form. It is also possible for tangential forces, for instance caused by the aforementioned harmonics, or radial forces generated by magnetic or mechanical asymmetries, to be transmitted only to the stator ring, but not to the guide magnet arrangement. In this manner, the smoothness of rotational operation of the rotor, which is very substantially defined by the guide magnet fields, is improved.

The rotationally symmetrical central component 16 of the stator 2 also has a gas supply arrangement comprising an annular array of gas nozzles 23 surrounding the guide magnet arrangement. The outlet openings 23' of the gas nozzles 23 are directed into the region between the opposing bearing faces of the rotor and the stator so as to generate the requisite gas cushion therebetween as indicated above.

The inlet ends of the gas nozzles 23 communicate with a gas chamber 22 into which a gas delivery pipe 24 discharges. The gas delivery pipe 24 communicates in turn via an elastic supply hose 25 with a centralized source of gas supply (not shown). Typically, only a single gas supply is provided for the entire machine, with corresponding gas supply conduits extending over the entire length of the machine.

As can be seen from FIG. 1, the rotationally symmetrical central component 16 is recessed slightly relative to the remaining bearing face of the stator, and as a result a larger air gap that the air gap 11 is formed in this region. This has the advantage in particular that vibration in this region does not lead to contact of the opposed bearing faces, thereby to avoid any attendant damage.

Figure 2:
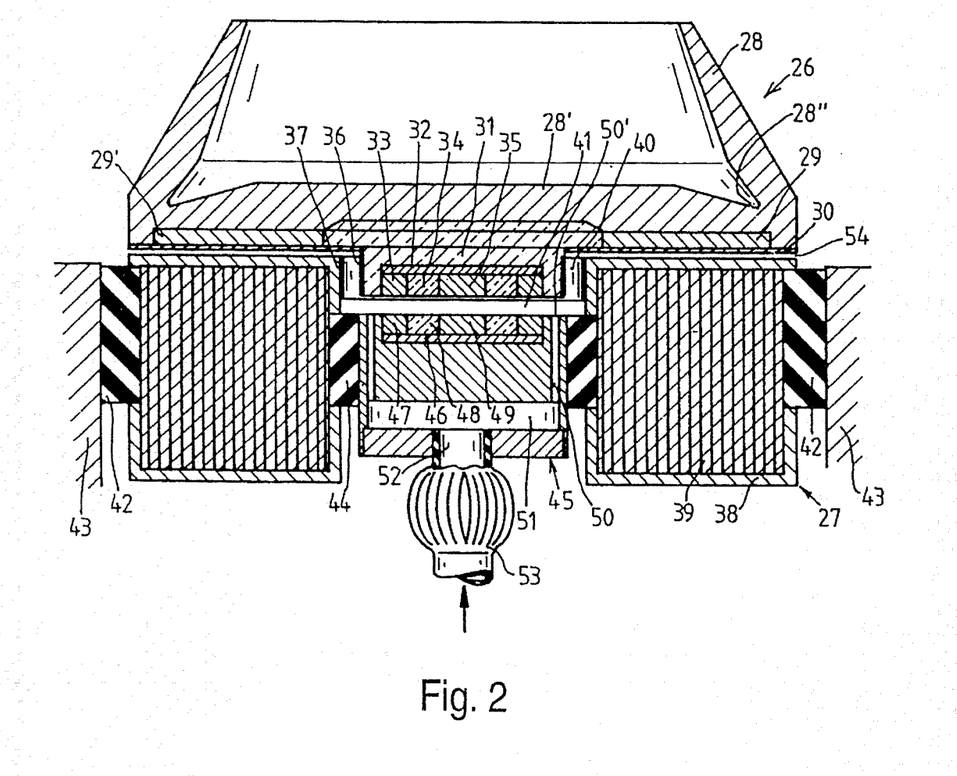
FIG. 2 is another axial cross-sectional view of a shaftless spinning rotor assembly according to another embodiment of the invention wherein the rotor and the stator have stepped bearing faces.

In an alternative embodiment of the invention shown in FIG. 2, the bearing face 30 of the rotor 26 is markedly stepped at its central axis forming a hub-like projection which extends into a corresponding central recess at the center of the stator 27. As in the embodiment of FIG. 1, the spinning cup 23 with its annular fiber collecting groove 28' comprises the main component of the spinning rotor 26. The rotor 26 has a guide magnet arrangement which comprises a central retaining magnet 35 and a concentric magnet ring 33 spaced from one another by an insulating ring 34, and a flux conducting yoke 32 extending radially thereacross. This guide magnet arrangement of the rotor 26 is retained coaxially at the center of the underside of the rotor by a supporting and insulating composition 31, which in this embodiment has only magnetically insulating properties. A magnet supporting layer 30 is affixed to the underside of the rotor 26 to form the major part of the bearing face of the rotor 26, with the guide magnet arrangement of the rotor 26 projecting in rotationally symmetrical relation from the center of the bearing face 30. The rotor 26 also has an arrangement of drive magnets 29, 29' retained by the bearing layer 30 against the rotor base 28' which forms a flux conducting yoke for the drive magnets.

Mechanical decoupling of the guide magnet arrangement from the rotor 26 is not provided in this construction because, as a result of this disposition of the guide magnet arrangement projecting from the main portion of the bearing face 30, additional vibration could possible arise from the elasticity of any connecting means that would be utilized to accomplish mechanical decoupling. However, depending on the choice of embedding composition, particularly with respect to its damping properties, mechanical decoupling of the rotor cannot be precluded in this embodiment.

The stator 27 comprises a stator ring 39 surrounded by a winding assembly 38. An axial air gap is provided between the rotor 26 and the stator 27, the air gap in the region of the guide magnet arrangement at 41 being markedly larger than the air gap at 54 in the region of the stator ring 39.

The stator ring 39 is secured to a stationary machine part, preferably directly to the spinning box, by means of a rubber retaining ring 42, which assures a desired centering relative to other parts of the spinning box (not shown) which protrude into the rotor 28. A central component 45 of the stator 27 is connected coaxially within the center of the stator ring 39 by means of another rubber retaining ring 44 disposed radially between the stator ring 39 and the central component 45. By means of these two rubber retaining rings 42,44, this rotationally symmetrical central component 45 is doubly decoupled from vibration of the spinning box or spinning machine. The elastic damping properties of these rubber retaining rings assure a sufficiently effective decoupling or isolation of the component 45 that any such vibration has virtually no influence on this central component 45.

The central component 45 supports a guide magnet arrangement, which comprises a central retaining magnet 49, an insulating ring 48 concentrically surrounding it, and a magnet ring 47 disposed concentrically about the insulating ring, along with a common yoke 46. As in the first embodiment, gas nozzles 50 are disposed concentrically around the guide magnet arrangement, with their outlet openings 50' emerging into the air gap 41 above the central component 45. The gas nozzles 50 communicate at their opposite ends with a gas chamber 51, which in turn is supplied with compressed gas via a gas connection pipe 52 and a flexible gas supply hose 53.

A radial air gap 40 is created between the central component 45 and the stator ring 39 as a result of the stepped configuration of the bearing face of the rotor 26 and the recessed disposition of the central component 45 within the stator 27, the radial air gap 40 being bounded by annular protective faces 36,37 on the rotor and the stator. These protective faces comprise, for instance, annular ceramic inlays which have high stability. As a result, any rotor deflection under extreme conditions can be limited. A protective face surrounding the outer circumference of the rotor 26 is therefore unnecessary.

Furthermore, the air gap 41 is sufficiently large that, despite the elastic retention of the central component 45, contact with the rotating rotor 26 can be prevented even if the position of the central component changes.

In this embodiment as well, the mass of the components mechanically decoupled from one another is reduced compared with a compact stator embodiment and, as a result, the natural frequency is increased. Correspondingly, hereagain, the advantages already mentioned of suppression of vibration are attained, because of the large frequency interval between the natural frequency and the vibration frequency.

Figure 3:
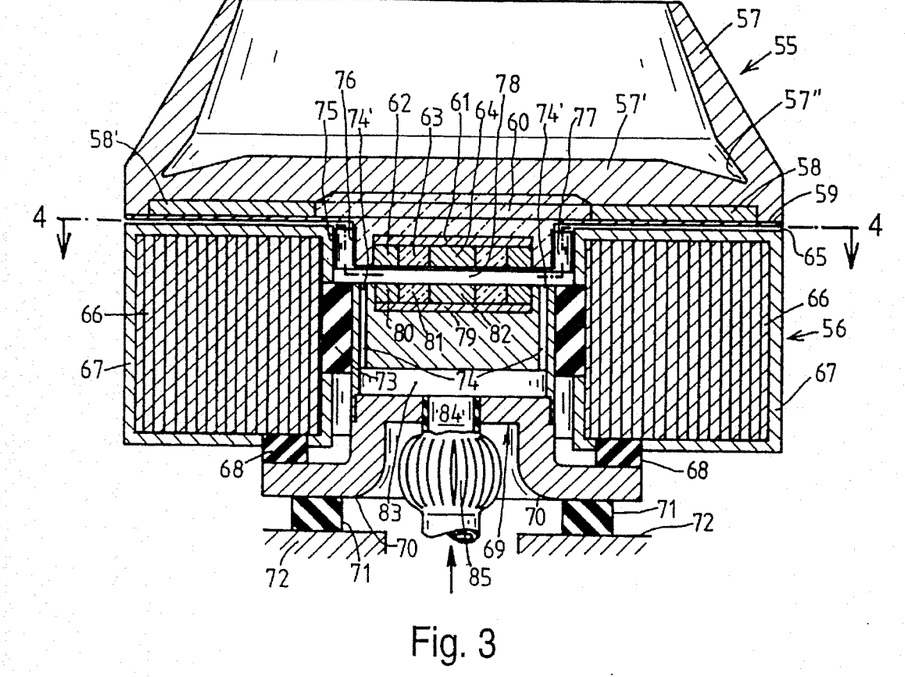
FIG. 3 is another axial cross-sectional view of a shaftless spinning rotor assembly according to another embodiment of the invention, in which the stator ring is connected solely to the central rotationally symmetrical magnet unit via connecting means that effect a mechanical decoupling thereof.
Figure 4:
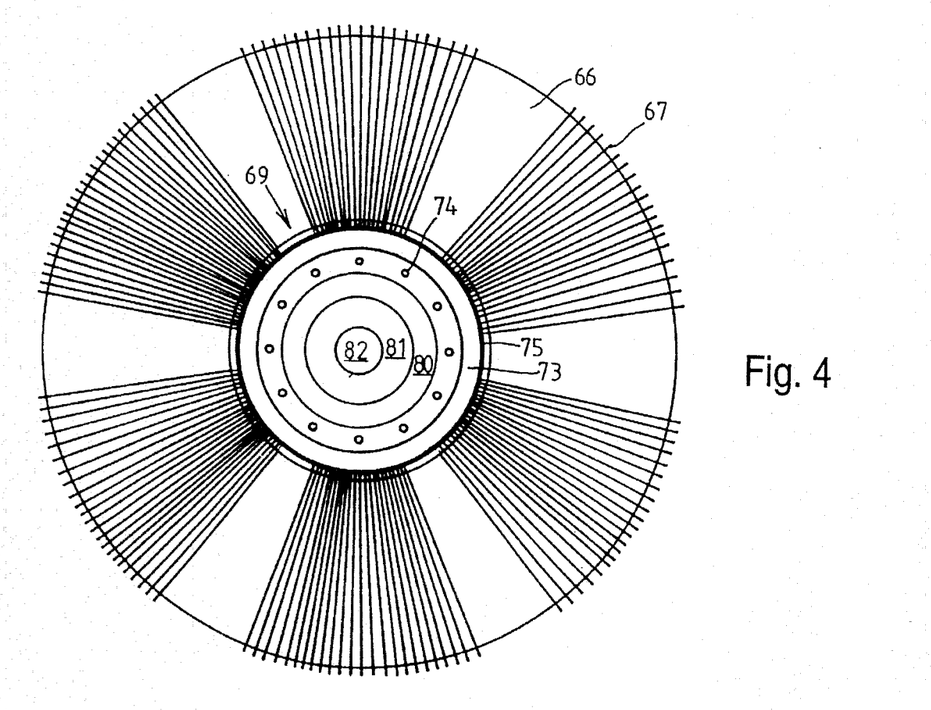
FIG. 4 is a radial cross-section of the spinning rotor assembly of FIG. 3 taken along line 4—4 of FIG. 3.

In a third embodiment which is shown in FIGS. 3 and 4, a stepped bearing arrangement between the rotor and the stator is also used. However, in this embodiment, it is not the stator ring 66 of the stator 56 that is mounted on a spinning machine component, as in the preceding example of FIG. 2, but rather the rotationally symmetrical central component 69 itself. Hence the stator ring 66 is doubly decoupled mechanically from the spinning machine.

The spinning rotor 55 essentially comprises a spinning cup 57 with a rotor base 57' and an annular fiber collecting groove 57''. Hereagain, the rotor base 57' forms the yoke for drive magnets 58 and 58'. However, it should be understood that in principle it is also possible to dispose a separate yoke between the spinning cup and the drive magnets and, for instance, to make the spinning cup as well of a material that has no magnetic properties.

A guide magnet arrangement of the spinning rotor 55 comprises a central retaining magnet 64, an insulating ring 63, a magnet ring 62, and a common yoke 62. This guide magnet arrangement is embedded in a supporting and insulating composition 60, which essentially has magnetically insulating properties. Once again, a magnet supporting layer 59 is provided, which forms the bearing face of the rotor.

An axial air gap 65 is provided between the main portions of the bearing faces of the rotor and the stator and, hereagain, is markedly smaller in its dimension than the axial air gap 78 at the center of the axial field motor. Analogously to the preceding embodiment, a radial air gap 77 is defined by two protective annular faces 75,76.

The stator 56 comprises a winding assembly 67 disposed about the stator ring 66, as shown in FIG. 4. The winding assembly 67 is essentially cast in a laminate and, in this embodiment, comprises six separate groups of individual windings, distributed uniformly about the circumference of the stator ring 66. These individual windings are supplied with current in succession in the direction of revolution of the rotor 55, with two opposed windings always being supplied with current at the same time but with a differing current flow direction. The resultant migrating magnetic fields create a torque in the drive magnets 58,58'. In this manner, the axial field motor can be operated as a synchronous motor in a known manner.

Rubber buffer rings 68,73 connect the rotationally symmetrical central component and the stator ring 66 and are joined to the adjacent components by vulcanization. For purposes of the present invention, it is insignificant whether the winding assembly 67 is placed in slots of the stator ring 66 or is mounted as shown on a smooth stator ring 66. In either case, the laminate layer that covers the winding assembly 67 may be designed accordingly. The illustration in the drawing of the boundary of the two rubber buffer rings 68,73 on the stator ring therefore is not intended to be definitive in this respect.

The embodiment of the stator 56 shown particularly in FIG. 4 is likewise not essential for purposes of the present invention. The invention is equally applicable if the windings are disposed horizontally, for instance, or in other words in a plane parallel to the sectional view of the drawing.

The embodiments of the stator ring 66 in FIGS. 3 and 4 and of the stator rings 12,39 in the first two embodiments of FIGS. 1 and 2 are likewise not limited to a circular form. Rather, any closed structure suitable for generating an orbiting electromotive force may be utilized, e.g., various forms of polygons.

A platelike attachment 70 affixed to the underside of the central component 69 is mounted to a stationary machine component 72 by means of a rubber buffer ring 71 and thereby serves to retain the component and effect the centering of the entire axial motor.

The central component carries a guide magnet arrangement which hereagain comprises a central retaining magnet 82, an insulating ring 81 and a magnet ring 80, as well as a common yoke disk 79. The central component 69 has a compressed gas supply for the magnetic gas bearing comprising a concentric arrangement of compressed gas nozzles 74 terminating in outlet openings 74' discharging into the axial air gap 78 as shown in FIG. 4. The compressed gas nozzles 74 are connected to a gas chamber 83 into which a gas connection pipe 84 discharges. Connected to the gas connection pipe 84 is a flexible gas supply hose 85 which is connected with a central pressurized gas supply as mentioned above.

In this embodiment, the location of the central component 69 is more strongly fixed than in the preceding embodiments. As a result of its dual decoupling from the fixed machine component 72, the stator ring 66 is markedly less limited in its motion. In this manner, a stable location of the central component 69 and hence of the guide magnet arrangement can be attained and, as a result, the position of the axis of rotation of the rotor 55 can be well fixed. Tangential forces resulting from harmonics and radial forces resulting from magnetic or mechanical asymmetries can be absorbed by the stator ring 66, which can vibrate independently because of the mechanical decoupling from the central component 69 and similarly is not limited otherwise in its freedom of motion by any direct connection with a fixed machine component.

Figure 5:
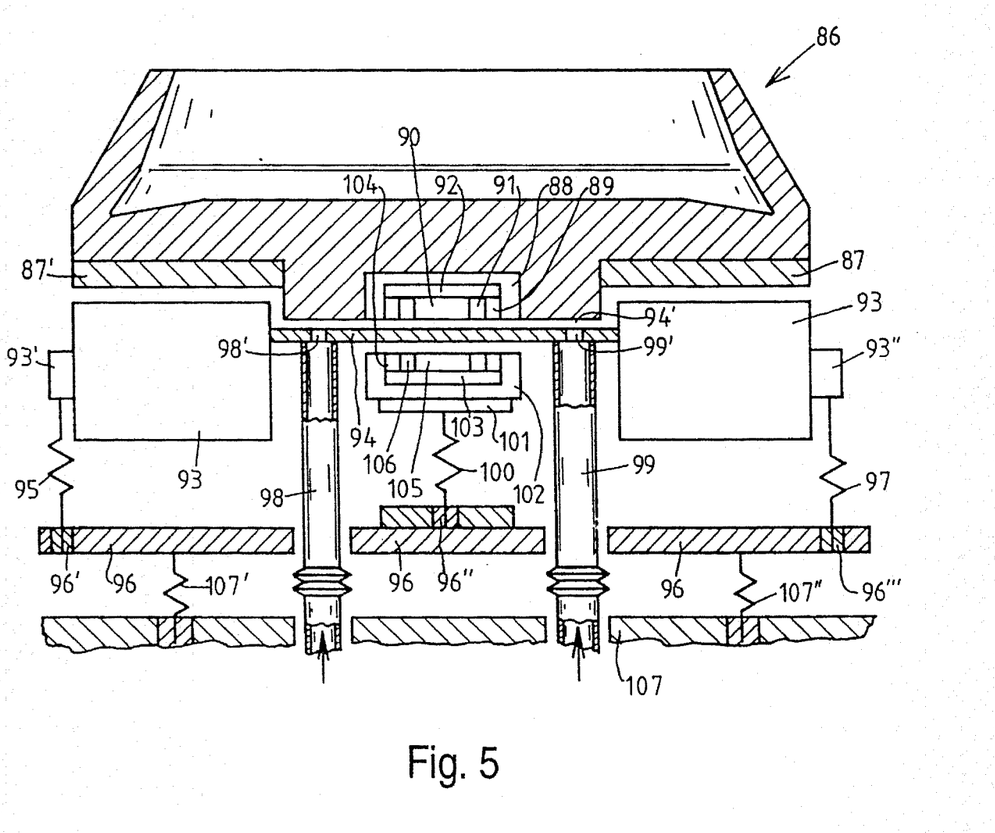
FIG. 5 is a simplified axial cross-sectional view of a shaftless spinning rotor assembly according to another embodiment of the invention.

In the further embodiment of the invention shown in FIG. 5, the connecting components of rubber or of a rubberlike material described thus far are replaced with metal springs, which in turn are supported on their opposite ends by retainers made of a rubberlike material.

In this embodiment, the spinning rotor 86 has drive magnets 87,87' and a guide magnet arrangement, comprising a magnet ring 89 concentric about a central retaining magnet 90 as well as a flux conducting yoke 92. The magnet ring 89 and the central retaining magnet 90 are radially separated from one another by an insulating ring 91 made of a magnetically insulating material. An elastic supporting and insulating composition 88 separates the guide magnets from the base of the spinning rotor 86, the rotor base at the same time serving as a flux-conducting yoke for the drive magnets 87,87'. In this embodiment as well, the bearing face of the rotor 86 is stepped, as in the examples of FIGS. 2–4. In the central region, an opposing bearing face is formed on the stator by a synthetic resin plate 94 to face the bearing face of the rotor. The synthetic resin plate 94 seals the radially central region of the stator ring 93 and limits the axial air gap 94' between the rotor 86 and the stator in this region. The resin plate also has air nozzles 98',99', which are supplied with compressed air via air ducts 98,99.

The stator also has a guide magnet arrangement comprising a magnet ring 104, a central retaining magnet 105 and a yoke 103 to generate a guide magnet field. An insulating ring 106 separating the magnets 104,105 assures radial magnetic insulation between the magnet ring 104 and the central retaining magnet 105. The entire magnet arrangement is surrounded by a preferably elastic support composition 102. A rubberlike layer 101 serves as a retainer for connecting one end of a metal spring 100 to the guide magnet arrangement, the other end of which is likewise embedded in a rubberlike composition 96" secured in turn to a plate 96. The stator ring 93 is likewise supported on the plate 96 via rubberlike retaining elements 93',93" and steel springs 95,97 which are embedded in blocks 96' and 96'" of rubberlike material.

The central guide magnet arrangement of the stator and the stator ring are mechanically decoupled in this manner from the plate 96. In addition, the plate 96 is mechanically decoupled from a stationary machine component 107 by springs 107',107" which can likewise in turn be embedded in rubberlike compositions.

Figure 6:
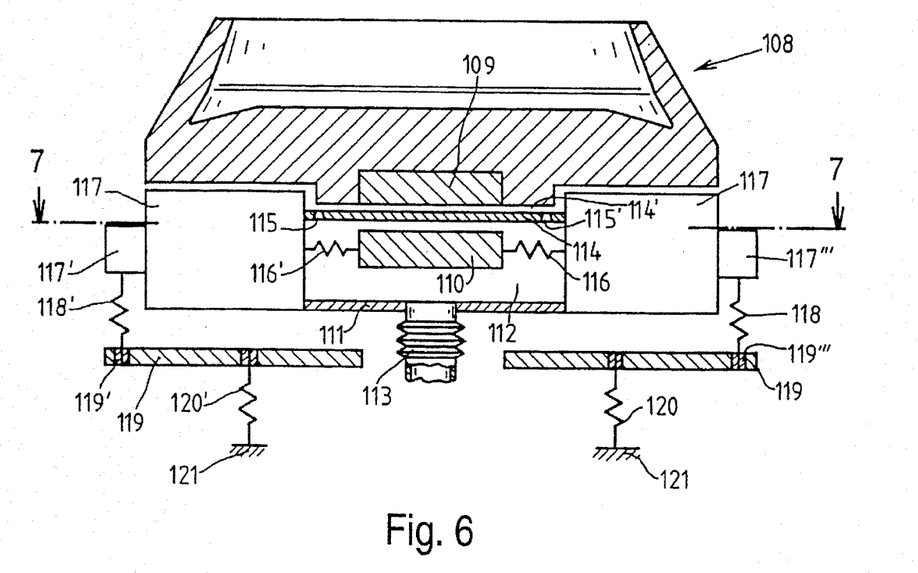
FIG. 6 is another simplified axial cross-sectional view of a shaftless spinning rotor assembly according to another embodiment of the invention.
Figure 7:
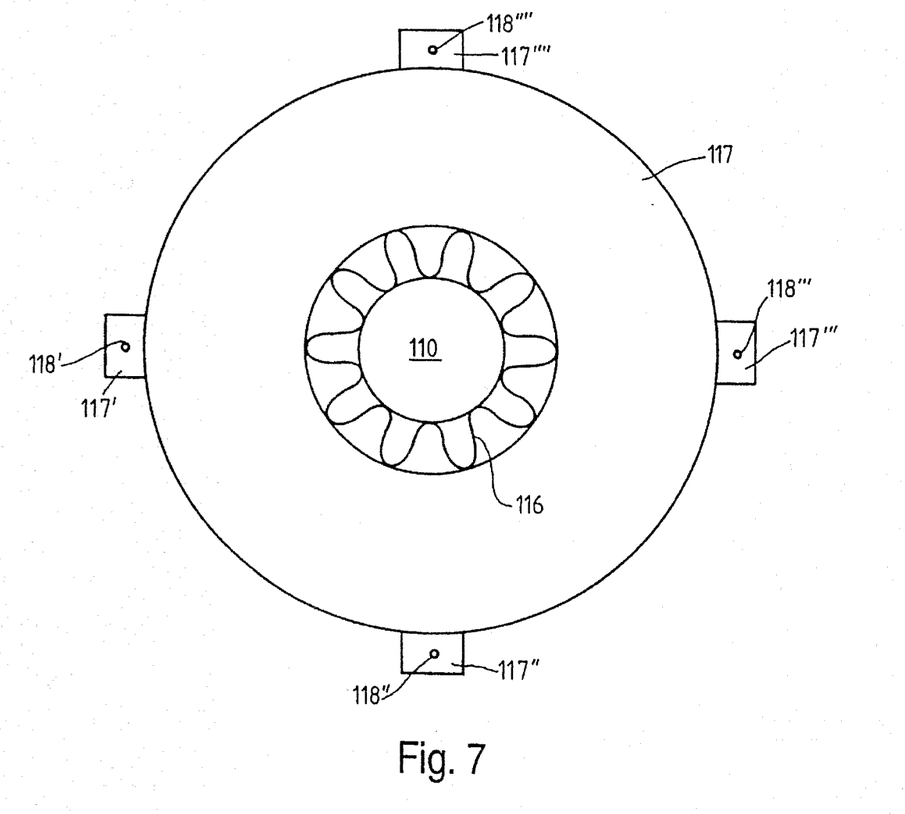
FIG. 7 is a radial cross-section of the spinning rotor assembly of FIG. 6 taken along line 7—7 of FIG. 6.

Another embodiment of the invention is shown in FIGS. 6 and 7, wherein a specific embodiment of connecting means between the central magnet arrangement and the stator ring is provided. In this embodiment, the spinning rotor 108 is embodied in accordance with the preceding embodiment of FIG. 5, the magnet arrangement associated with the rotor for generating the guide magnet field being only representatively indicated at 109 because it has already been described in detail above. The guide magnet arrangement 110 associated with the stator is likewise shown only schematically. Centrally within the stator ring 117, its bearing face is hereagain embodied as a synthetic resin plate 114 that defines an axial air gap 114' and has air nozzles 115,115'. However, it should be understood that the number of air nozzles is in no way limited to two and, actually, an annular distribution of the air nozzles of the kind shown in FIG. 4 is preferred.

An annular spring 116 disposed between the central magnet arrangement 110 associated with the stator and the stator ring 117 is of a sinusoidal configuration, as shown particularly in FIG. 7. As a result, a very good distribution of the spring action over the entire circumference of the central guide magnet arrangement 110 in relation to the stator ring 117 can be attained.

The stator ring 117 is joined to a support plate 119 via springs 118' to 118"" which are connected to the stator ring 117 and the plate 119, respectively, via retainers 117' through 117"" and 119' through 119"", respectively. The plate 119 is in turn supported by steel springs 120,120' on a stationary machine component 121.

An air reservoir or chamber 112 is defined by the synthetic resin plate 114 and by a further base plate 111 located in parallel relation therebelow and is supplied with compressed air via an air duct 113. The air nozzles 115,115' in the resin plate 114 are in turn supplied from this air reservoir 112.

While the various embodiments described herein each utilize permanent magnets, those persons skilled in the art will understand that the present invention is not limited to the use of permanent magnets. For example, instead of using permanent magnets as rotor drive magnets, it is also conceivable to use a hysteresis material and to operate the motor as a hysteresis motor instead of as a synchronous motor.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

I claim:

1. A shaftless rotor assembly for an open-end spinning machine comprising an axial field motor including a rotor and a stator ring, the rotor having a body defining a spinning chamber, an opening into the chamber and a bearing face opposite the rotor opening, and the stator ring having an opposed facing bearing face, means for producing a combined magnetic and gas bearing for supporting the rotor relative to the stator ring including means for producing a first field of magnetic flux for guiding a rotational axis of the rotor to orient and maintain the axis in a stationary disposition, the means for producing the guiding magnetic field including a rotationally symmetrical magnet unit arranged within the stator ring concentric with the rotor axis, means for producing a second field of magnetic flux for driving rotation of the rotor about the axis, means for conducting the magnetic flux for the driving and guiding magnetic fields, resilient damping means for mechanically decoupling the rotationally symmetrical magnet unit and the stator ring from one another, means for mounting the stator ring to a stationary component of the spinning machine, the mounting means including means for mechanically decoupling the stator ring and the stationary component, and a generally nonmagnetic barrier layer disposed between the first and second flux conducting means for decoupling the respective magnetic fluxes.

2. The shaftless spinning rotor assembly of claim 1, wherein the resilient damping means comprises an elastically compressible material.

3. The shaftless spinning rotor assembly of claim 1, wherein the resilient damping means comprises a spring.

4. The shaftless spinning rotor assembly of claim 1, wherein the mounting means comprises an elastically compressible material.

5. The shaftless spinning rotor assembly of claim 1, wherein the mounting means comprises a spring.

6. The shaftless spinning rotor assembly of claim 1, wherein the resilient damping means comprises an elastically compressible material and the mounting means comprises a spring.

7. The shaftless spinning rotor assembly of claim 1, wherein the barrier layer comprises an elastic damping material.

8. The shaftless spinning rotor assembly of claim 1, wherein the means for producing the first field of magnetic flux further comprises a magnet arrangement on the rotor concentric with the rotor axis, the rotationally symmetrical magnet unit and the magnet arrangement comprising permanent magnets, the means for producing the second field of magnetic flux comprises a pair of permanent magnets symmetrically disposed at a radial spacing from one another outwardly of the magnets of the guiding magnetic field, and each magnetic flux conducting means comprises yokes disposed for joining magnetic poles of the respective magnetic flux fields.

9. The shaftless spinning rotor assembly of claim 8, wherein the yokes associated with the rotor are spaced apart axially from and are concentric with one another.

10. The shaftless spinning rotor assembly of claim 9, wherein the rotationally symmetrical magnet unit is disposed in a recess in the opposed bearing face of the stator and the magnet arrangement on the rotor comprises a rotationally symmetrical magnet unit projecting from the bearing face of the rotor and extending into the recess with an air gap therebetween.

11. The shaftless spinning rotor assembly of claim 10, wherein the rotationally symmetrical magnet unit is recessed into the bearing face of the stator to a greater axial extent than the axial extent to which the magnet arrangement on the rotor projects from the bearing face of the rotor.

12. The shaftless spinning rotor assembly of claim 1, wherein the rotationally symmetrical magnet unit comprises nozzle means for delivering a gas between the rotor and the stator for producing a gas cushion therebetween.

13. The shaftless spinning rotor assembly of claim 1, and further comprising means for pneumatic sealing between the rotationally symmetrical magnet unit and the stator ring.

14. The shaftless spinning rotor assembly of claim 1, wherein the resilient damping means effects a pneumatic sealing between the rotationally symmetrical magnet unit and the stator ring.

15. The shaftless spinning rotor assembly of claim 1, wherein the rotor and the stator have wear-resistant surfaces which are radially spaced apart by an annular air gap.

16. The shaftless spinning rotor assembly of claim 1, wherein the rotationally symmetrical magnet unit is connected to a stationary component of the spinning machine.

* * * * *